(12) United States Patent
Ban

(10) Patent No.: US 7,656,577 B2
(45) Date of Patent: Feb. 2, 2010

(54) COLOR FILTER SUBSTRATE, ELECTROPHORETIC DISPLAY DEVICE HAVING THE SAME, AND METHOD OF MANUFACTURING THE SAME

(75) Inventor: Byeong-Seob Ban, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 91 days.

(21) Appl. No.: 11/933,353

(22) Filed: Oct. 31, 2007

(65) Prior Publication Data

US 2008/0304134 A1 Dec. 11, 2008

(30) Foreign Application Priority Data

Nov. 20, 2006 (KR) .................. 10-2006-0114294
Dec. 5, 2006 (KR) .................. 10-2006-0121941

(51) Int. Cl.
*G02B 26/00* (2006.01)
*G09G 3/34* (2006.01)

(52) U.S. Cl. .................. 359/296; 345/107
(58) Field of Classification Search .......... 345/107; 359/296

See application file for complete search history.

(56) References Cited

U.S. PATENT DOCUMENTS

2004/0145562 A1* 7/2004 Horikiri .................. 345/107
2008/0117496 A1* 5/2008 Park et al. .................. 359/296

\* cited by examiner

*Primary Examiner*—David N Spector
(74) *Attorney, Agent, or Firm*—Cantor Colburn LLP

(57) ABSTRACT

A color filter substrate includes a base substrate, a color filter layer and an electrophoretic layer. A partition wall section is formed on a first surface of the base substrate. The partition wall section divides the base substrate into a transparent area and a light-blocking area to define a pixel space in the transparent area. The color filter layer is formed in the transparent area. The electrophoretic layer is formed in the pixel space. The electrophoretic layer includes a capsule with a plurality of electrophoretic particles. Therefore, the partition wall section thereby forms the pixel space corresponding to a pixel part, and an electrophoretic layer is infiltrated into the pixel space, so that reflecting ratio and color reproducibility may be enhanced.

21 Claims, 15 Drawing Sheets

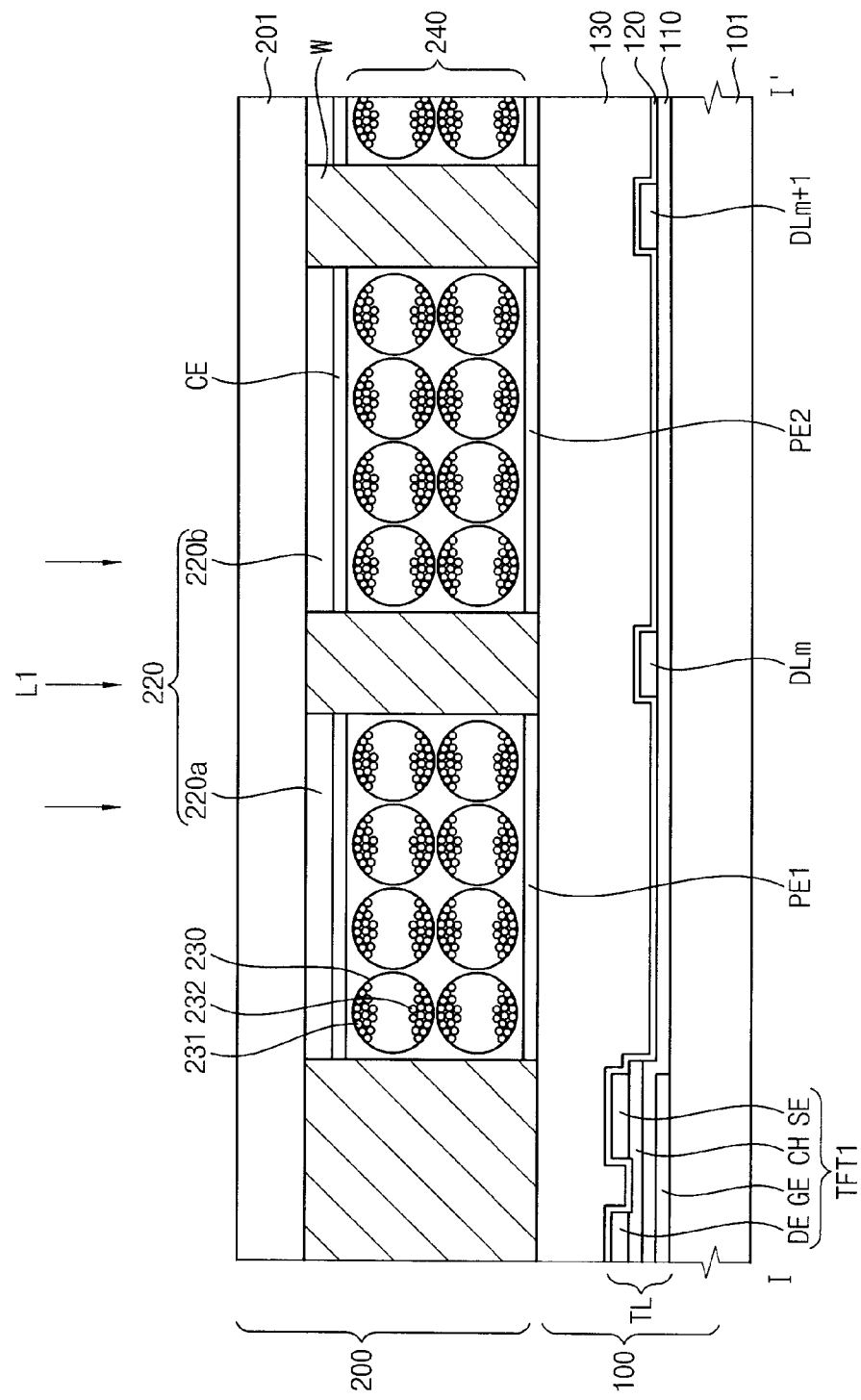

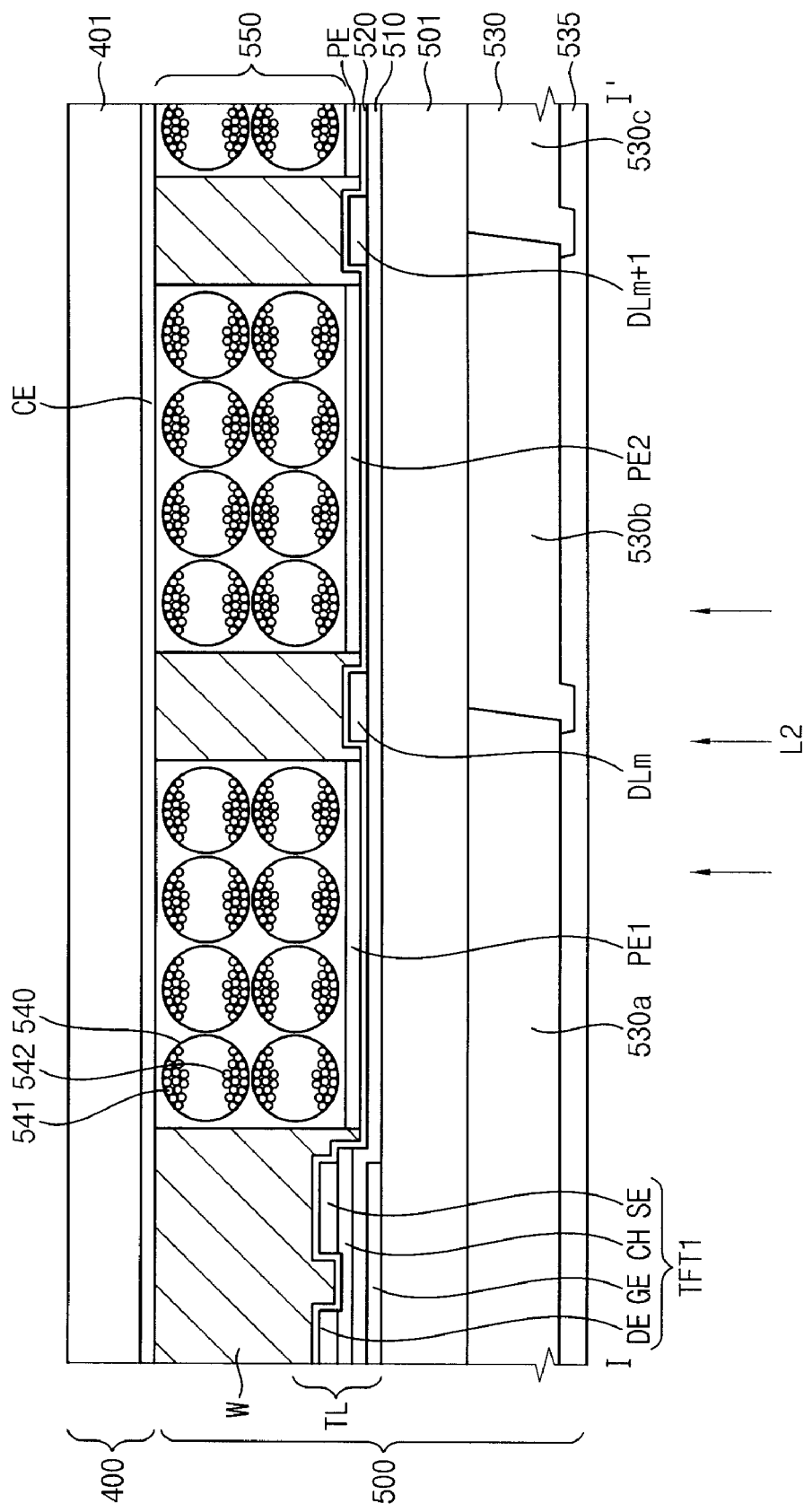

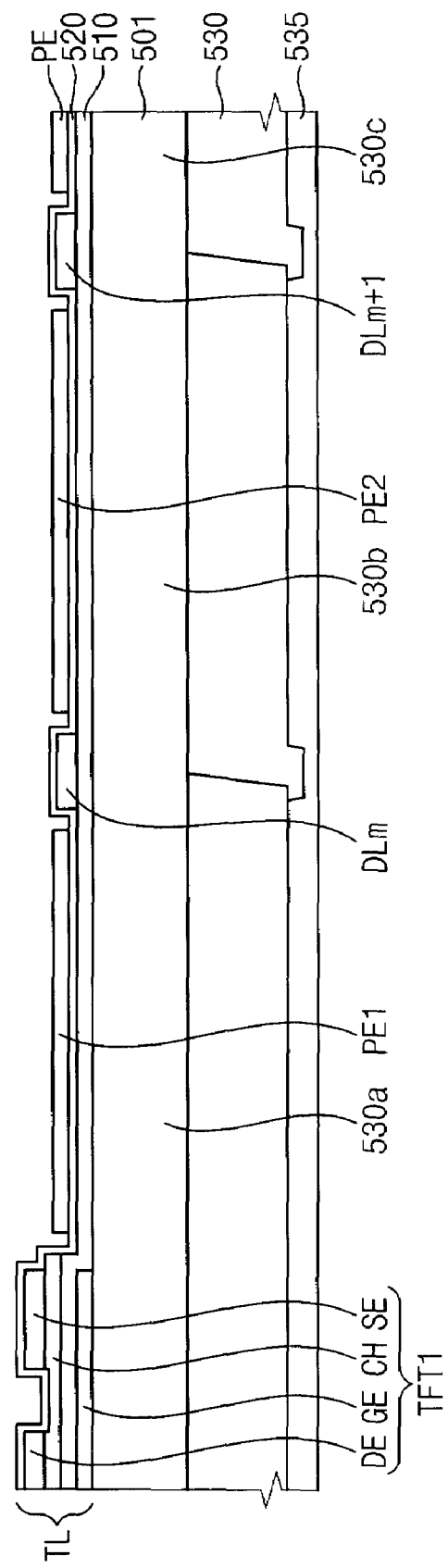

COLOR FILTER SUBSTRATE, ELECTROPHORETIC DISPLAY DEVICE HAVING THE SAME, AND METHOD OF MANUFACTURING THE SAME

This application claims priority to Korean Patent Application No. 2006-114294, filed on Nov. 20, 2006, and Korean Patent Application No. 2006-121941, filed on Dec. 5, 2006, and all the benefits accruing therefrom under 35 U.S.C. § 119, the contents of which in its entirety are herein incorporated by reference.

BACKGROUND OF THE INVENTION

1. Field of the Invention

The present invention relates to a color filter substrate, an electrophoretic display ("EPD") device having the color filter substrate, and a method of manufacturing the color filter substrate. More particularly, the present invention relates to a color filter substrate capable of enhancing reflecting ratio and color reproducibility, an EPD device having the color filter substrate, and a method of manufacturing the color filter substrate.

2. Description of the Related Art

A conventional EPD device has a reflecting type structure which displays images by reflecting light applied externally of the EPD device.

FIG. 1 is a schematic diagram showing a conventional EPD device.

Referring to FIG. 1, the EPD device includes negatively charged white ink particles 1, positively charged black ink particles 2, for example, microcapsules 5 encapsulating transparent organic fluids 3 and binders combining the microcapsules 5, which are disposed between two electrodes.

When an electric field is applied to the two electrodes, the white ink particles and the black particles move toward opposite directions to display black or white images. That is, external light applied to the EPD device is reflected by the white ink particles 1 which moves toward an eye, so that images are displayed.

The EPD devices have a high reflectance and a high contrast regardless of the viewing direction. Thus, a screen of the EPD device is as comfortable to watch as a paper sheet. Since each microcapsule is stable in either a black or a white state, each microcapsule maintains the black or white state without maintaining a voltage across the electrodes. Accordingly, power consumption of the EPD device is lower in comparison with that of other display devices. In addition, the EPD device may be manufactured at a low cost since the EPD devices do not require polarizers, alignment layers, liquid crystal, etc., which are expensive requisites for liquid crystal display ("LCD") devices.

BRIEF SUMMARY OF THE INVENTION

The present invention provides a color filter substrate for an electrophoretic display ("EPD") device capable of enhancing reflecting ratio and color reproducibility.

The present invention also provides an EPD device having the color filter substrate.

The present invention further provides a method of manufacturing the color filter substrate of an electrophoretic display ("EPD") device.

In one exemplary embodiment of the present invention, a color filter substrate includes a base substrate, a color filter layer and an electrophoretic layer. A partition wall section is formed on a first surface of the base substrate. The partition wall section divides the base substrate into a transparent area and a light-blocking area to define a pixel space in the transparent area. The color filter layer is formed in the transparent area. The electrophoretic layer is formed in the pixel space. The electrophoretic layer includes a capsule with a plurality of electrophoretic particles.

In an exemplary embodiment, the color filter substrate further includes an electrode layer including an optically transparent and electrically conductive material, which is formed between the first surface and the electrophoretic layer.

In an exemplary embodiment, the color filter substrate further includes a thin-film transistor ("TFT") layer formed between the first surface and the electrode layer. The TFT layer includes a gate metal pattern and a source metal pattern. The gate metal pattern includes a plurality of gate lines and a gate electrode of the TFT. The source metal pattern includes a plurality of source lines extended to cross the gate lines, and a source metal pattern having a source electrode of the TFT and a drain electrode of the TFT.

For example, the electrode layer includes a plurality of pixel electrodes electrically connected to respective TFTs. The color filter layer is formed on the TFT layer corresponding to the pixel electrodes. The partition wall section is formed on the color filter layer between the pixel electrodes.

For example, the color filter layer is formed on a second surface of the base substrate that faces the first surface in correspondence with the pixel electrode. The partition wall section is formed on the TFT layer between the pixel electrodes.

In another exemplary embodiment of the present invention, an electrophoretic display ("EPD") device includes a color filter substrate and an opposite substrate. The color filter substrate includes a partition wall section, a color filter layer and an electrophoretic layer. The partition wall section is formed on a first surface of a first base substrate and divides the first base substrate into a transparent area and a light-blocking area to define a pixel space in the transparent area. The color filter layer is formed in the transparent area. The electrophoretic layer is formed in the pixel space and includes a plurality of capsules having a plurality of electrophoretic particles. The opposite substrate faces the color filter substrate.

In yet another exemplary embodiment of the present invention, a method of manufacturing a color filter substrate is provided. A partition wall section is formed on a first surface of a base substrate. The partition wall section divides the base substrate into a transparent area and a light-blocking area to define a pixel space in the transparent area. Then, a color filter layer is formed in the transparent area. Then, an electrophoretic layer is formed in the pixel space. The electrophoretic layer including a plurality of electrophoretic particles.

According to the present invention, a partition wall section is formed thereby forming a pixel space corresponding to a pixel part, and an electrophoretic layer is infiltrated into the pixel space, so that a reflecting ratio and a color reproducibility may be enhanced.

BRIEF DESCRIPTION OF THE DRAWINGS

The above and other aspects, features and advantages of the present invention will become readily apparent by reference to the following detailed description when considered in conjunction with the accompanying drawings wherein:

FIG. 3 is a cross-sectional view showing the EPD device along line I-I' according to the first exemplary embodiment of the present invention;

FIG. 8 is a cross-sectional view showing an EPD device according to a fourth exemplary embodiment of the present invention; and FIGS. 9A to 9C are cross-sectional views showing a method for manufacturing a color filter substrate of the EPD device in FIG. 8 according to an exemplary embodiment of the present invention.

DETAILED DESCRIPTION OF THE INVENTION

Figure 1:
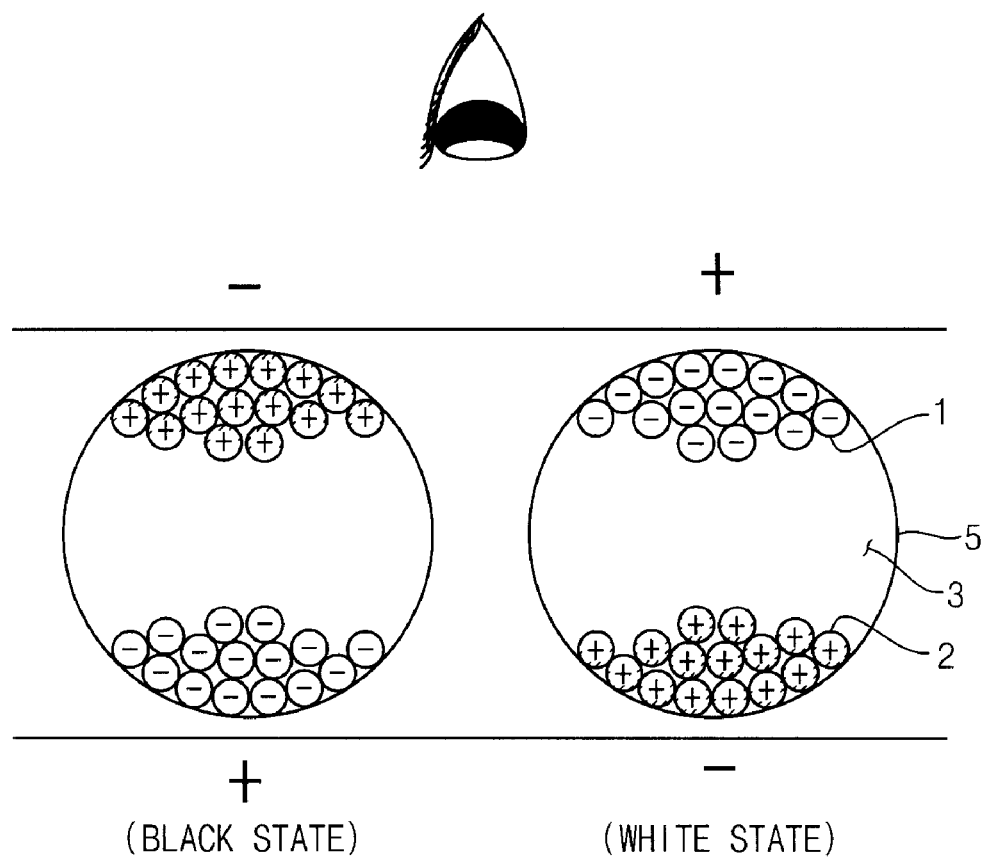
FIG. 1 is a schematic diagram showing a conventional electrophoretic display ("EPD") device.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in further detail with reference to the accompanying drawings.

Figure 2:
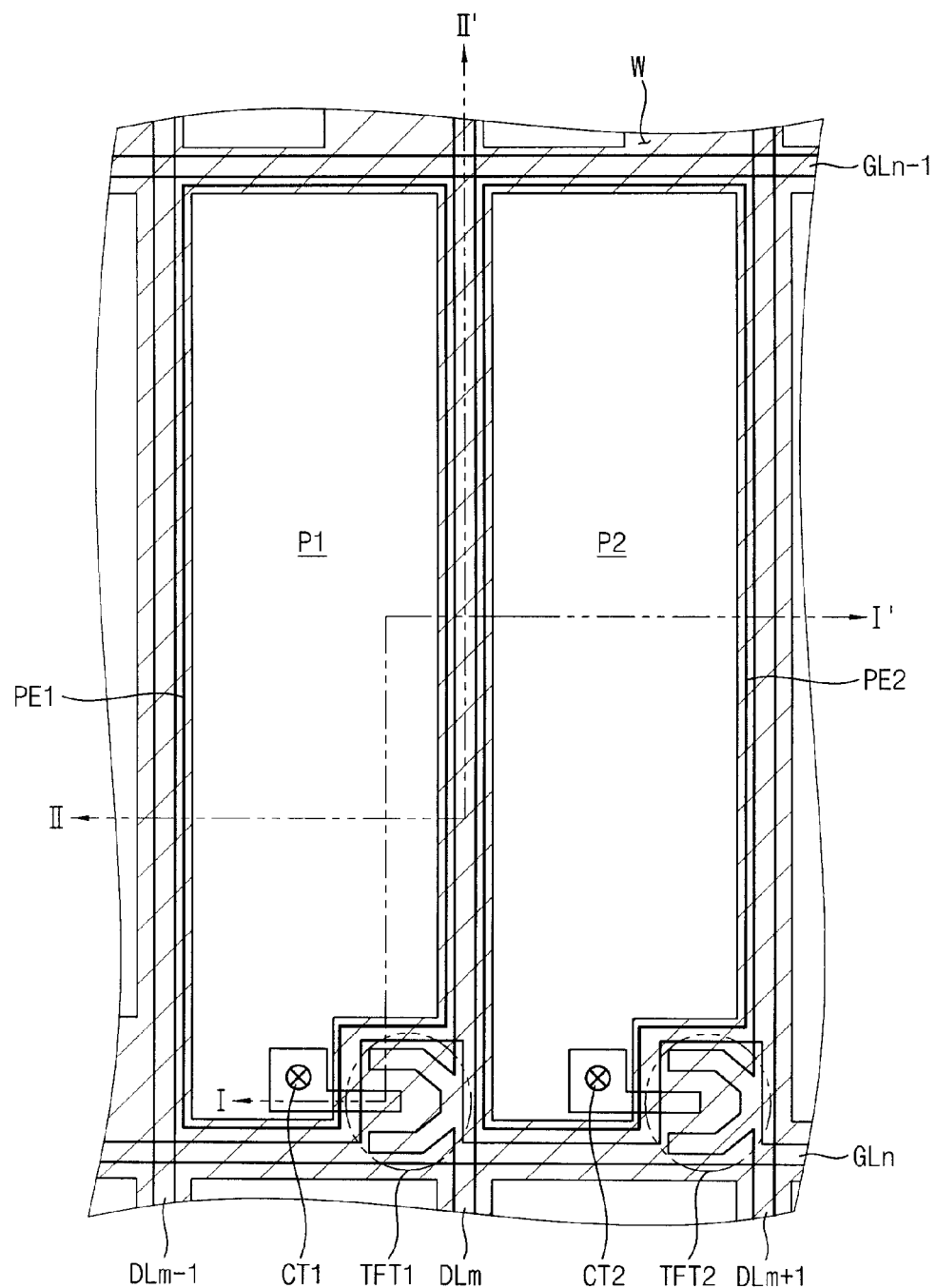
FIG. 2 is a plan view showing a portion of a first exemplary embodiment of an EPD device according to the present invention.

FIG. 2 is a plan view showing a portion of a first exemplary-embodiment of an electrophoretic display ("EPD") device according to the present invention. FIG. 3 is a cross-sectional view showing the EPD device according to the first exemplary embodiment of the present invention. Particularly, FIG. 3 is a cross-sectional view taken along line I-I' shown in FIG. 2.

Referring to FIGS. 2 and 3, an EPD device of the present invention includes an array substrate 100, a color filter substrate 200 having an electrophoretic layer 240.

The array substrate 100 includes a first base substrate 101. The first base substrate 101 includes a material which shields light and reflects light. For example, the first substrate 101 may include a mirror.

A plurality of gate lines GLn−1 and GLn and a plurality of source lines DLm−1, DLm and DLm+1 (wherein m and n are natural numbers) are formed on the array substrate 101 (FIG. 2). The gate lines GLn−1 and GLn are extended along a first direction, and the source lines DLm−1, DLm and DLm+1 are extended along a second direction that crosses the first direction, as illustrated in FIG. 2.

In exemplary embodiments, the gate lines GLn−1 and GLn and the source lines DLm−1, DLm and DLm+1 define a first pixel part P1 and a second pixel part P2 on the first base substrate 101. For example, the first pixel part P1 may include a first thin-film transistor ("TFT") (or first TFT1) and a first pixel electrode PE1. The first TFT1 is electrically connected to an (n)-th gate line GLn and (m)-th data line DLm. The first pixel electrode PE1 is electrically connected to the first TFT1 through a first contact portion CT1.

The first TFT1 includes a first gate electrode GE, a gate insulation layer 110, a first channel part CH, a first source electrode SE, a first drain electrode DE and a protecting insulation layer 120. The first gate electrode GE is electrically connected to the (n)-th gate line GLn. The gate insulation layer 110 is formed on the first gate electrode GE. The first channel part CH is formed on the gate insulation layer 110. The first source electrode SE is electrically connected to the (m)-th data line DLm. The first drain electrode DE is electrically connected to the first pixel electrode PE1. The protecting insulation layer 120 is formed on the first source and drain electrodes SE and DE. An organic insulation layer 130 is formed on the protection insulation layer 120. Alternatively, the organic insulation layer 130 may not be formed on the protection insulation layer 120.

The second pixel part P2 includes a second TFT2 and a second pixel electrode PE2. The second TFT2 is electrically connected to (n)-th gate line GLn and (m+1)-th data line DLm+1. The second pixel electrode PE2 is electrically connected to the second TFT2 through a second contact portion CT2. The second TFT2 has the same structure of the first TFT1 as shown in FIGS. 2 and 3, therefore further explanation will be omitted.

A pixel electrode layer PE is formed on the TFT layer TL. The pixel electrode layer PE includes a first pixel electrode PE1 electrically connected to the first TFT1 through a first contact portion CT1 and a second pixel electrode PE2 electrically connected to the second TFT2 through a second contact portion CT2.

The color filter substrate 200 includes a second base substrate 201, a partition wall section W, a color filter layer 220, a common electrode layer CE and an electrophoretic layer 240. The second base substrate 201 may include a flexible material. For example, the second base substrate 201 includes a plastic material such as polyethylene terephthalate ("PET") which has excellent light transmittance, thermal resistance, chemical resistance, physical strength, for example, but is not limited to the foregoing.

The partition wall section W is formed in an area in which the first and second pixel electrodes PE1 and PE2 are not formed therein, thereby dividing the second base substrate 201 into a transparent area and a light-blocking area.

The light-blocking area which blocks light corresponds to the partition wall section W, and the transparent area which transmits light corresponds to the remaining area. For example, the partition wall section W is formed in an area having the first and second TFT1 and TFT2 formed therein and an area having a plurality of gate lines GLn−1 and GLn and a plurality of source lines DLm−1, DLm and DLm+1 formed therein.

The partition wall section W defines a pixel space corresponding to first and second pixel parts having first and second pixel electrodes PE1 and PE2, respectively.

A color filter layer 220 is formed in a pixel space defined by the partition wall section W. The color filter layer 220 includes red, green and blue filter patterns 220a and 220b, for example, but is not limited thereto. The color filter layer 220 may further include a white filter pattern (not shown). For example, the white filter pattern may be overlapped with the red, green and blue filter patterns. Alternatively, in order to realize a function of the white filter pattern, the color filter layer 220 may not be formed through exposing the second base substrate 201.

A common electrode CE includes an optically transparent and electrically conductive material. The common electrode CE, as an opposite electrode facing the first and second pixel electrodes PE1 and PE2, receives a common voltage. The common electrode CE includes, for example, indium tin oxide ("ITO"), indium zinc oxide ("IZO") or amorphous-indium tin oxide ("a-ITO"), for example, but is not limited thereto.

The electrophoretic layer 240 may include a plurality of microcapsules 230 and a binder (not shown) combining the microcapsules 230. The microcapsules 230 are infiltrated into each pixel space defined by the partition wall section W. The first and second pixel parts P1 and P2 are divided by the partition wall section W, so that the microcapsules 230 are not disposed in a boundary portion between the first and second pixel parts P1 and P2. Therefore, a reduction of a reflecting ratio and a reduction of color reproducibility may be prevented. A reduction of the reflecting ratio and color reproducibility are generated when the microcapsules 230 are disposed in the boundary portion.

The microcapsules 230 may include a plurality of electrophoretic particles 231 and 232 which are negatively or positively charged. For example, the microcapsules 230 may include a plurality of white ink particles 231 negatively or positively charged and a plurality of black ink particles 232 inversely charged with respect to the white ink particles 231. For example, the white ink particles 231 may be positively charged, and the black ink particles 232 may be negatively charged.

In exemplary embodiment, the electrophoretic particles 231 and 232 are contained in the microcapsules 230. Alternatively, the electrophoretic particles 231 and 232 may be contained in a plurality of microcups.

Figure 4A:
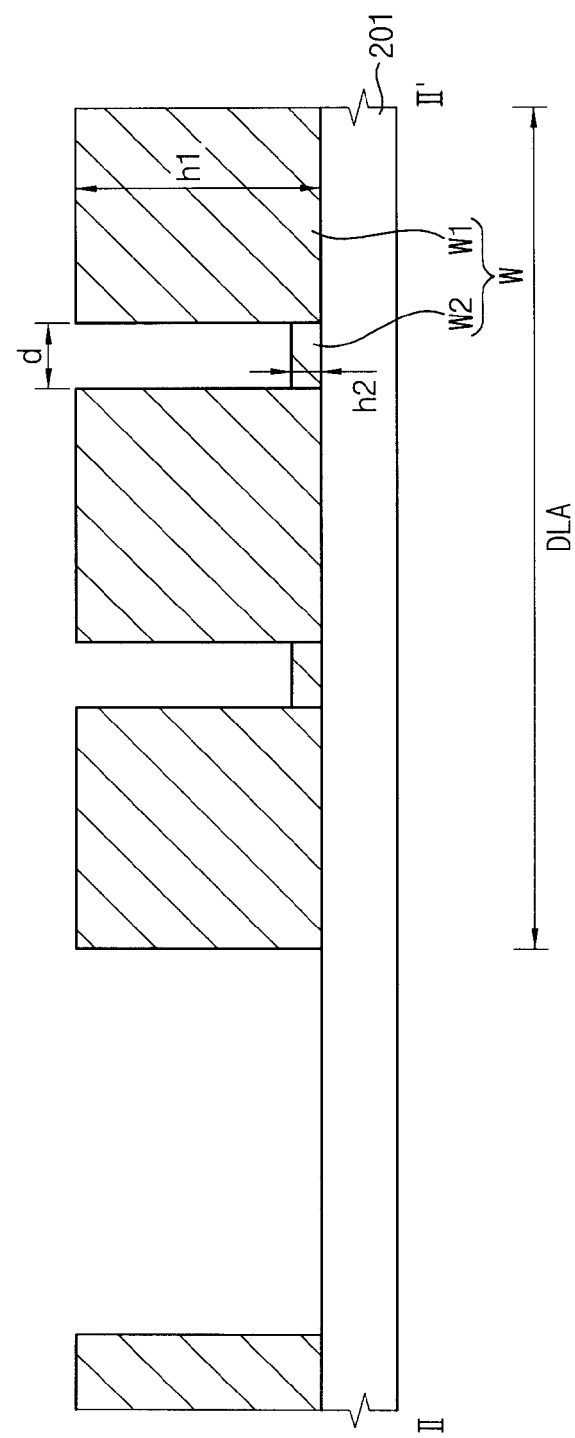
FIGS. 4A to 4C are cross-sectional views showing a method for manufacturing a color filter substrate of the EPD device along line II-II' in FIG. 3 according to an exemplary embodiment of the present invention.
Figure 4B:
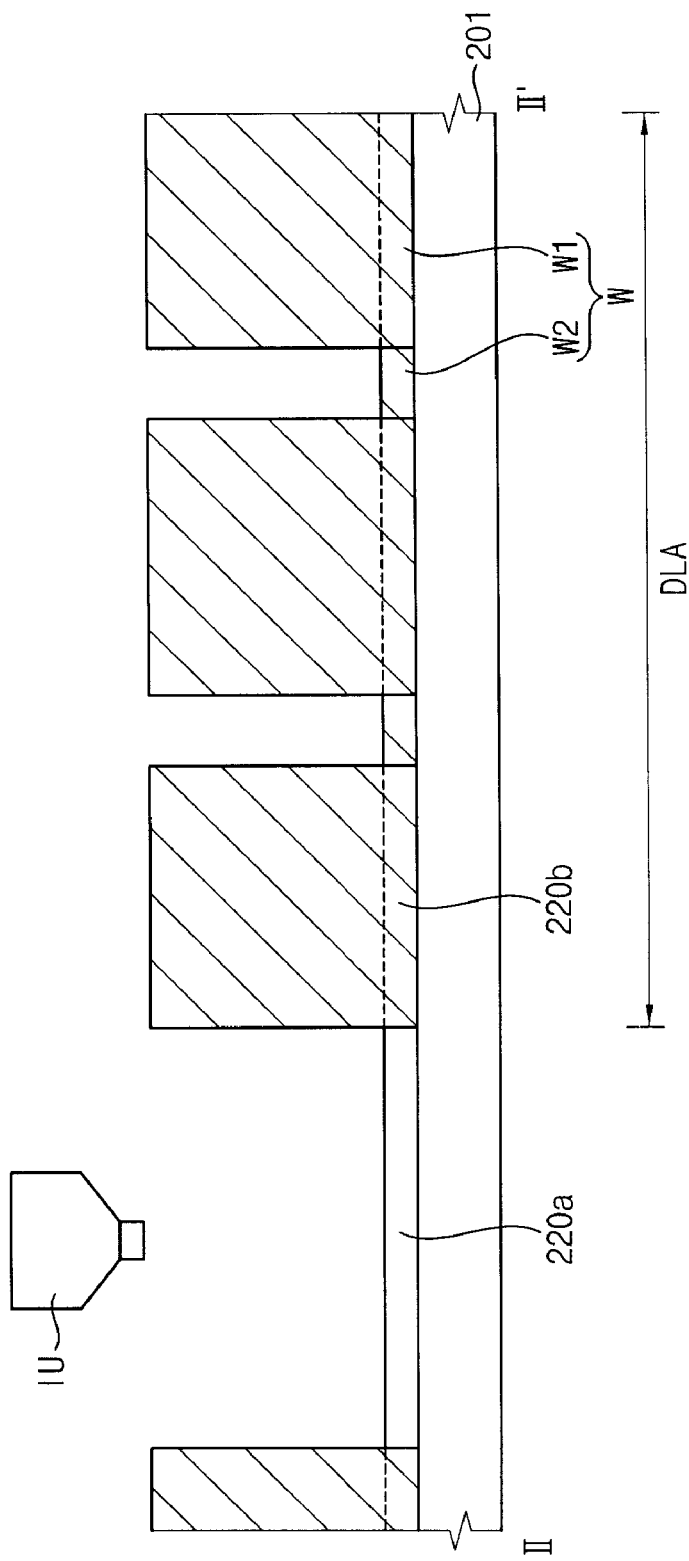
Figure 4C:
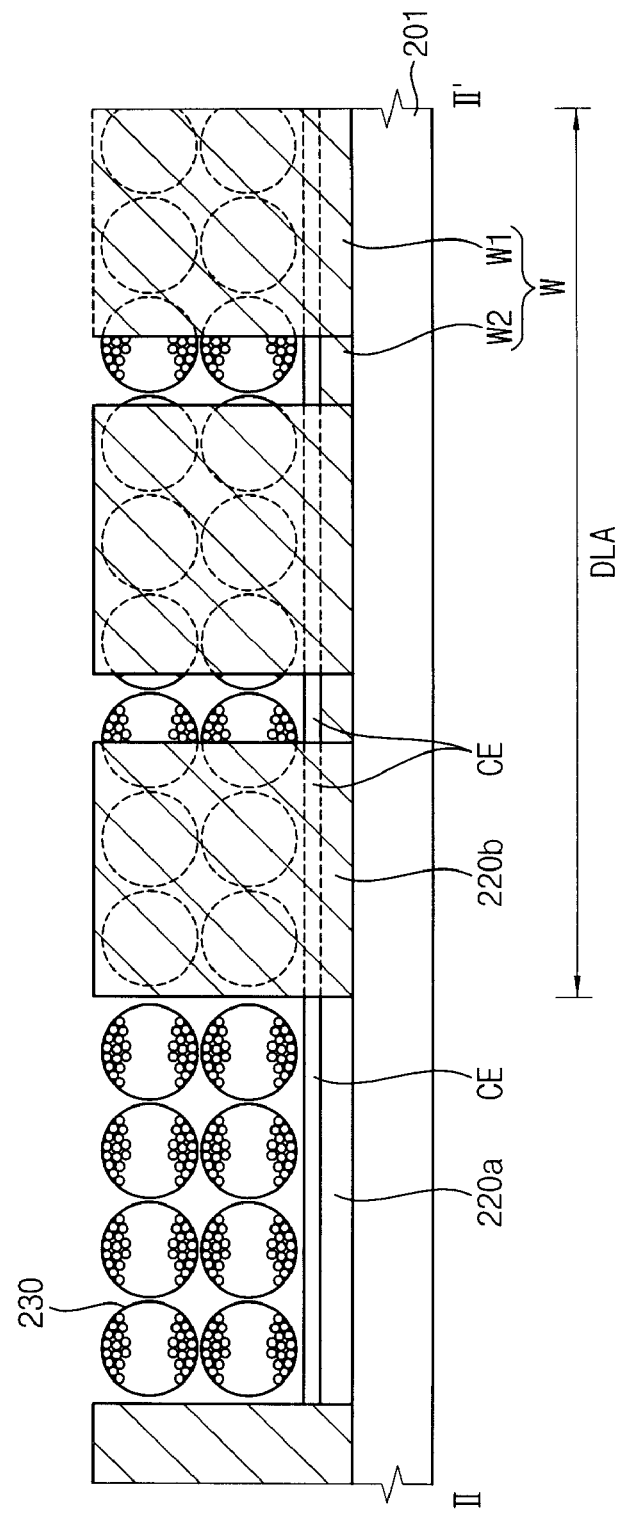

FIGS. 4A to 4C are cross-sectional views showing a method for manufacturing a color filter substrate of the EPD device in FIG. 3. Particularly, FIGS. 4A to 4C are cross-sectional views taken along line II-II' shown in FIG. 3.

Referring to FIGS. 2, 3 and 4A, the partition wall section W is formed on the second base substrate 201 in correspondence with the gate lines GLn−1 and GLn and the source lines DLm−1 and DLm. The partition wall section W includes a first partition wall W1 having a first height 'h1' and a second partition wall W2 having a second height 'h2' lower than the first height 'h1'.

For example, the partition wall section W formed in a source wiring area DLA may include a first partition wall W1 of a first height 'h1' and a second partition wall W2 of a second height h2. The second partition wall W2 is formed between the adjacent first partition walls W1. The first height 'h1' corresponds to a forming height of the electrophoretic layer 240, and the second height 'h2' corresponds to a forming height of the color filter layers 220a and 220b.

Referring to FIG. 4B, the color filter layer 220a and 220b is formed on the second base substrate 201 having the partition wall section W formed thereon through an ink jet unit IU. The color filter layer 220a and 220b is formed having a thickness of the second height 'h2' of the second partition wall W2.

The color filter layer 220a and 220b is not mixed with different color filter layers and the color filter layer 220a and 220b is formed in adjacent pixel spaces by the first and second partition walls W1 and W2.

Referring to FIG. 4C, a common electrode layer CE is formed on the second base substrate 201 having the color filter layer 220a and 220b formed thereon. The color filter layer 220a and 220b has a thickness of a second height 'h2' of the second partition wall W2. The common electrode layer CE includes an optically transparent and electrically conductive material.

The common electrode layer CE is formed in the second base substrate 201 having the color filter layer 220a and 220b with the second height 'h2' formed therein, so that the common electrode layer CE is commonly formed in the total pixel space. Therefore, a common voltage may be applied to the common electrode layer CE.

The microcapsules 230 are sprayed on the second base substrate 201 having the common electrode layer CE formed thereon by an ink jet method to form the electrophoretic layer 240. The microcapsules 230 are filled to a first height 'h'1 of the first partition wall W1. For example, a width of the second partition wall W2 is formed smaller than a diameter of the microcapsules 230, thereby preventing flow of the microcapsules 230 from infiltrating into adjacent pixel spaces.

Figure 5:
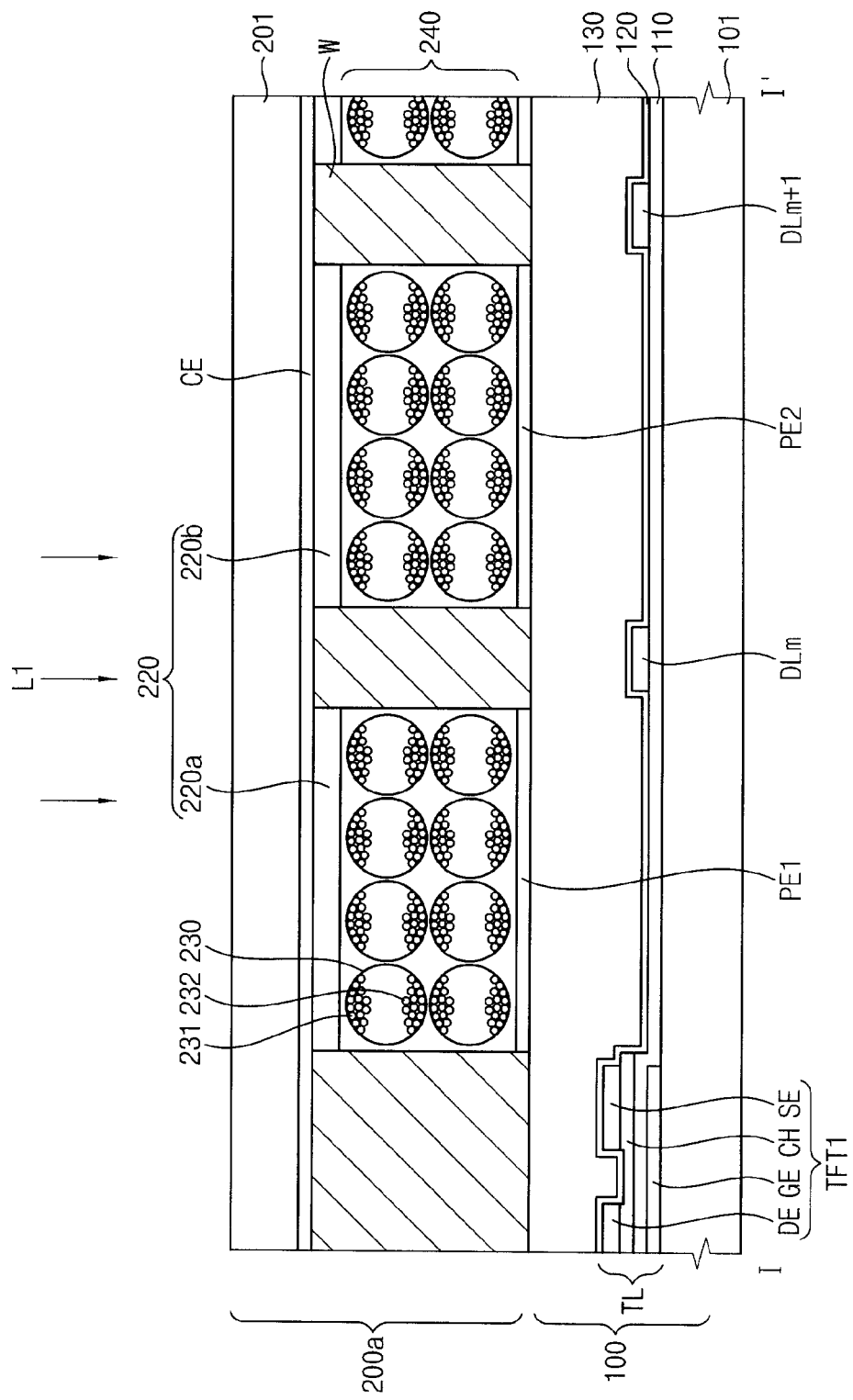
FIG. 5 is a cross-sectional view showing an EPD device according to a second exemplary embodiment of the present invention.

FIG. 5 is a cross-sectional view showing an EPD device according to a second exemplary embodiment of the present invention. Particularly, FIG. 5 is a cross-sectional view taken along line I-I' shown in FIG. 2.

Referring to FIGS. 2 and 5, an EPD device includes an opposite substrate 100 and a color filter substrate 200a having an electrophoretic layer 240.

The opposite substrate 100 has the same structure of the opposite substrate shown in FIG. 3, therefore further explanation will be omitted.

The color filter substrate 200a has a common electrode layer CE formed on the second base substrate 201. A partition wall W is formed on the second base substrate 201 having the common electrode layer CE formed thereon. The partition wall W is formed with a substantially uniform height. For example, the partition wall W may be formed with the first height 'h1' shown in FIG. 4A. A color filter layer 220a and 220b is formed in the pixel spaces which are formed by the partition wall section W through an ink jet method.

That is, the color filter substrate 200a has a common electrode layer CE formed between the second base substrate 201 and the color filter layer 220 in comparison with the color filter substrate 200 according to the exemplary embodiment shown in FIG. 3. The microcapsules 230 are sprayed in the pixel spaces having the color filter layers 220a and 220b formed therein by an ink jet method to form the electrophoretic layer 240.

The microcapsules 230 are infiltrated into the pixel spaces defined by the partition wall section W. The first and second pixel parts P1 and P2 are divided by the partition wall section W, so that the microcapsules 230 are not disposed in a boundary portion between the first and second pixel parts P1 and P2. Therefore, a reduction of a reflecting ratio and a reduction of color reproducibility may be prevented, which are generated when the microcapsules 230 are disposed in the boundary portion.

Figure 6:
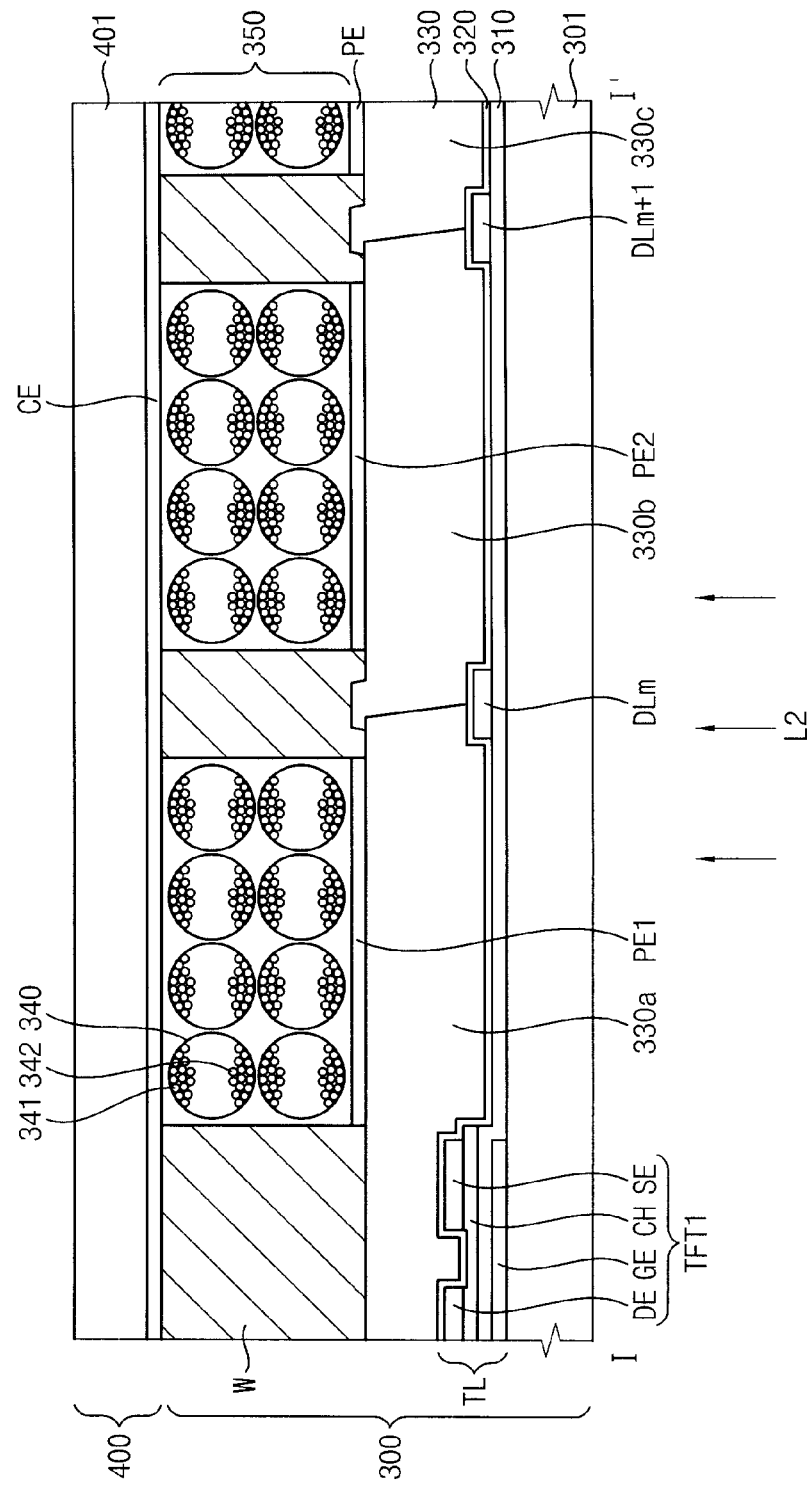
FIG. 6 is a cross-sectional view showing an EPD device according to a third exemplary embodiment of the present invention.

FIG. 6 is a cross-sectional view showing an EPD device according to a third exemplary embodiment of the present invention. Particularly, FIG. 6 is a cross-sectional view taken along line I-I' shown in FIG. 2.

Referring to FIGS. 2 and 6, an EPD device includes a color filter substrate 300 and an opposite substrate 400 facing the color filter substrate 300.

The color filter substrate 300 includes a first base substrate 301, a thin-film transistor ("TFT") layer TL, a color filter layer 330, a pixel electrode layer PE, a partition wall W and an electrophoretic layer 350.

The first base substrate 301 includes a first surface and a second surface facing the first surface, and contains a transparent insulation material which transmits light L2 entered from the second surface.

The TFT layer TL is formed on the first surface of the first base substrate 301. The TFT TL includes a plurality of gate wirings GLn−1 and GLn, a plurality of source wirings DLm−1, DLm and DLm+1 (wherein m and n are natural numbers), a first TFT1 and a second TFT2. The gate wirings GLn−1 and GLn are extended along a first direction. The source wirings DLm−1, DLm and DLm+1 are extended along a second direction crossing the first direction, as illustrated in FIG. 2. The first TFT1 is electrically connected to the gate wiring GLn−1 and the source wiring DLm. The second TFT2 is electrically connected to the gate wiring GLn and the source wiring DLm+1.

The first base substrate 301 includes a first pixel part P1 and a second pixel part P2. The first and second pixel parts P1 and P2 are defined by the gate wirings GLn−1 and GLn, and the source wirings DLm−1, DLm and DLm+1 in exemplary embodiments, but are not limited thereto. In particular, the first TFT1 which is electrically connected to (n)-th gate wiring GLn and (m)-th source wiring DLm, is formed in the first pixel part P1.

The first TFT1 includes a first gate electrode GE, a gate insulation layer 310, a first channel part CH, a first drain electrode DE and a protecting insulation layer 320. The first gate electrode GE is electrically connected to the (n)-th gate wiring GLn. The gate insulation layer 310 is formed on the first gate electrode GE. The first channel part CH is formed on the gate insulation layer 310. The first drain electrode DE is electrically connected to the first pixel electrode PE1. The protecting insulation layer 320 is formed on the first source and first drain electrode SE and DE.

The second pixel part P2 includes a second TFT2 electrically connected to (n)-th gate line GLn and (m+1)-th data line DLm+1, respectively. The second TFT2 has the same structure of the first TFT1 shown in FIGS. 2 and 6, and therefore further explanation will be omitted.

The color filter layer 330 is formed on the TFT TL. The color filter layer 330 may include a red filter pattern 330a, a green filter pattern 330b and a blue filter pattern 330c, for example, but is not limited thereto. Each color filter patterns 330a, 330b and 330c is formed in the corresponding pixel parts, respectively.

The pixel electrode layer PE of an optically transparent and electrically conductive material is formed on the color filter layer 330. For example, the optically transparent and electrically conductive material may include ITO, IZO or a-ITO, for example, but is not limited thereto. The pixel electrode layer PE includes a first pixel electrode PE1 electrically connected to the first TFT1 through a first contact portion CT1 and a second pixel electrode PE2 electrically connected to the second TFT2 through a second contact portion CT2.

For example, the color filter layer 330 is formed on the TFT layer TL corresponding to the first and second pixel electrodes PE1 and PE2.

The partition wall W is formed on the color filter later 330 corresponding to an area in which the pixel electrode layer PE is not formed therein, that is, an area between the pixel electrodes PE1 and PE2.

The light-blocking area which blocks light corresponds to the partition wall section W, and the transparent area which transmits light corresponds to the remaining area. For example, the partition wall section W is formed in an area having the first TFT1 and second TFT2 formed therein and an area having a plurality of gate lines GLn−1 and GLn and a plurality of source lines DLm−1, DLm and DLm+1 formed therein.

In exemplary embodiments, the partition wall section W defines a pixel space corresponding to first and second pixel parts having first and second pixel electrodes PE1 and PE2, respectively.

The electrophoretic layer 350 includes a plurality of microcapsules 340 and a binder (not shown) combining the microcapsules 341 and 342 to each other. The microcapsules 340 are infiltrated into the pixel spaces defined by the partition wall section W.

The first and second pixel parts P1 and P2 are divided by the partition wall section W, so that the microcapsules 340 are not disposed in a boundary portion between the first and second pixel parts P1 and P2. Therefore, a reduction of a reflecting ratio and a reduction of color reproducibility may be prevented, which are generated when the microcapsules 230 are disposed in the boundary portion.

The opposite substrate 400 includes a second base substrate 401 and a common electrode layer CE. The second base substrate 401 may include a flexible material. For example, the second substrate 401 may include a polyethylene terephthalate ("PET") which has excellent light transmittance, thermal resistance, chemical resistance, and physical strength, for example, but is not limited thereto. The common electrode layer CE may include an optically transparent and electrically conductive material.

The opposite substrate 400 is attached to the color filter substrate 300 by a ruminator (not shown).

Figure 7A:
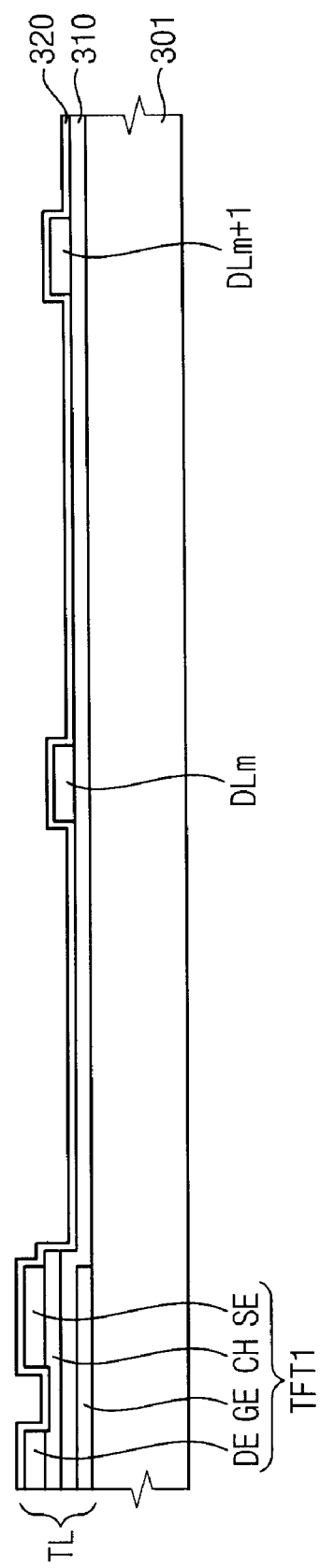
FIGS. 7A to 7C are cross-sectional views showing a method for manufacturing a color filter substrate of the EPD device in FIG. 6 according to an exemplary embodiment of the present invention.
Figure 7B:
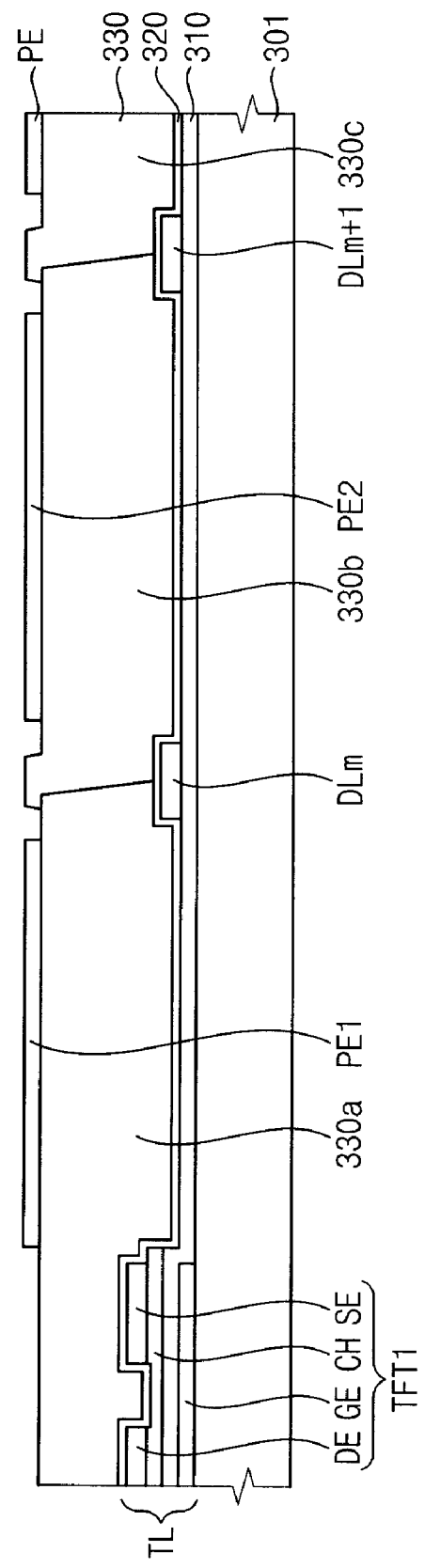
Figure 7C:
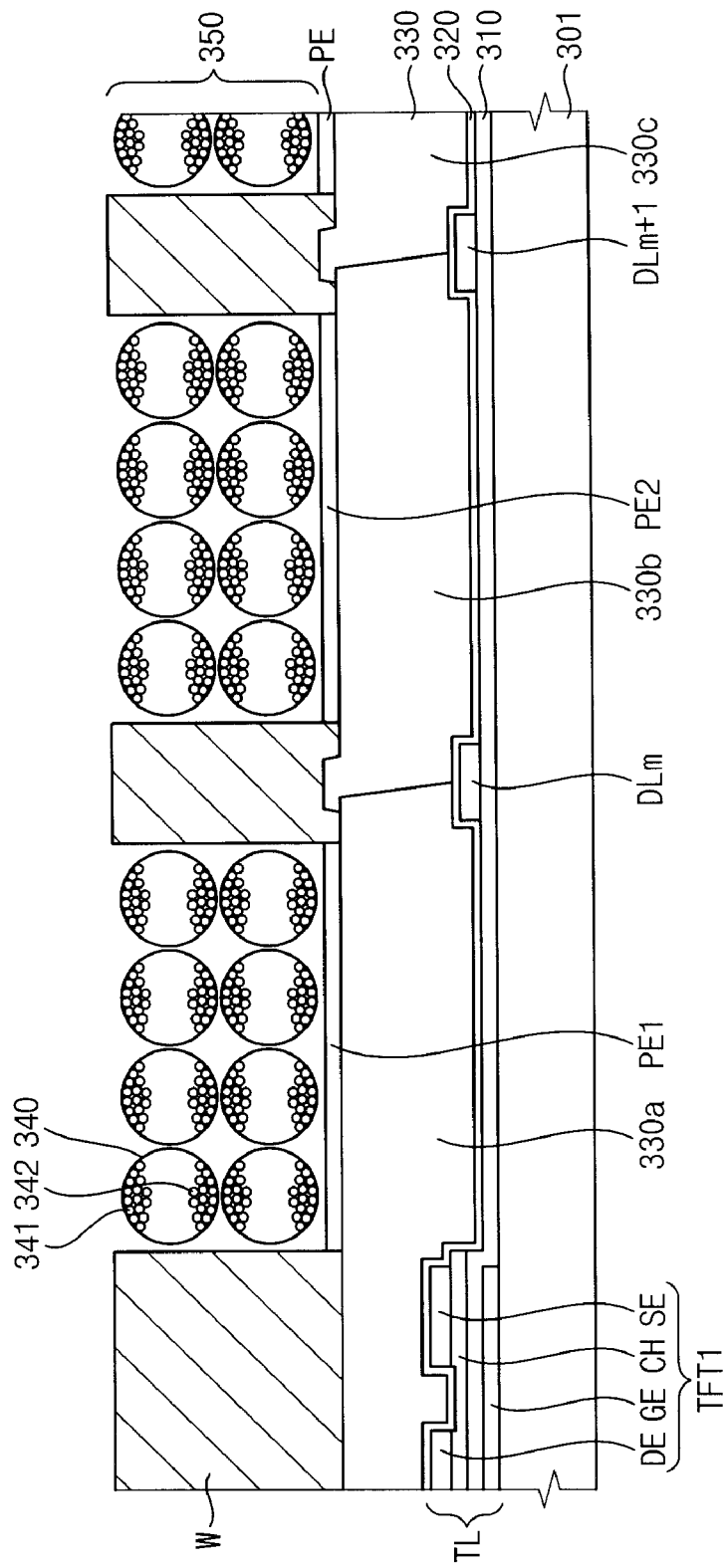

FIGS. 7A to 7C are cross-sectional views showing a method for manufacturing a color filter substrate of the EPD device in FIG. 6.

Referring to FIGS. 2 and 7A, a TFT layer TL is formed on a first base substrate 301. Particularly, a gate metal pattern including a plurality of gate wirings GLn−1 and GLn, and a first gate electrode GE is formed on the first base substrate 301. A gate insulation layer 310 is formed on the gate metal pattern of the first base substrate 301. A channel pattern including a first channel part CH is formed on the gate insulation layer 310.

A source metal pattern is formed on the first base substrate 301 having the channel pattern formed therein, which includes a plurality of source wirings DLm−1, DLm and DLm+1, a first source electrode SE and a first drain electrode DE. A protecting insulation layer 320 is formed on the source metal pattern of the first base substrate 301. A first TFT1 and a second TFT2 are formed on the first base substrate 301. Alternatively, the protecting insulation layer 320 may not be formed.

Referring to FIGS. 2 and 7B, a color filter layer 330 is formed on the TFT layer TL. For example, a red filter pattern 330a is formed in a red pixel section, a green filter pattern 330b is formed in a green pixel section, and a blue filter pattern 330c is formed in a blue pixel section. The red, green and blue pixel sections correspond to a plurality of pixel parts, respectively. In exemplary embodiments, the pixel parts are defined by the gate wirings GLn−1 and GLn, and the source wirings DLm and DLm+1.

The color filter layer 330 and the protecting insulation layer 320 are patterned to form a first contact portion CT1 and a second contact portion CT2. A pixel electrode layer PE is formed on the color filter layer 330 having the first and second contact portions CT1 and CT2 formed therein. The pixel electrode layer PE includes a first pixel electrode PE1 and a second pixel electrode PE2. The first pixel electrode PE1 is electrically connected to the first TFT1 through the first contact portion CT1. The second pixel electrode PE2 is electrically connected to the second TFT2 through the second contact portion CT2.

Referring to FIGS. 2 and 7C, a partition wall W is formed on the first base substrate 301 having the pixel electrode layer PE formed therein. The partition wall W is formed on the color filter layer 330 corresponding to an area in which the pixel electrode layer PE is not formed therein, so that the partition wall W defines a pixel space corresponding to the pixel electrode PE. For example, the partition wall W is formed in an area corresponding to the first TFT1 and second TFT2, and an area corresponding to the gate and source wirings GLn−1, GLn, DLm−1, DLm and DLm+1.

An electrophoretic layer 350 including a plurality of electrophoretic particles 340 is formed in a pixel space having the partition wall W formed therein. The microcapsules 340 include a plurality of electrophoretic particles 341 and 342 which are either negatively or positively charged.

FIG. 8 is a cross-sectional view showing an EPD device according to a fourth exemplary embodiment of the present invention. Particularly, FIG. 8 is a cross-sectional view taken along line I-I' shown in FIG. 2.

Referring to FIGS. 2 and 8, an EPD device includes a color filter substrate 500 and an opposite substrate 400 facing the color filter substrate 500.

The color filter substrate 500 includes a first base substrate 501, a TFT layer TL, a color filter layer 530, a pixel electrode layer PE, a partition wall W and an electrophoretic layer 550.

The first base substrate 501 includes a first surface and a second surface facing the first surface, and contains a transparent insulation material which transmits light L2 entered from the second surface.

The TFT layer TL is formed on the first surface of the first base substrate 501. The TFT TL includes a plurality of gate wirings GLn−1 and GLn, a plurality of source wirings DLm−1, DLm and DLm+1, a first TFT1 and a second TFT2. The gate wirings GLn−1 and GLn are extended along a first direction. The source wirings DLm−1, DLm and DLm+1 extend along a second direction crossing the first direction, as illustrated in FIG. 2. The first TFT1 is electrically connected to the gate wiring GLn−1 and the source wiring DLm. The second TFT2 is electrically connected to the gate wiring GLn and the source wiring DLm+1.

The first base substrate 501 includes a first pixel part P1 and a second pixel part P2. In exemplary embodiments, the first and second pixel part P1 and P2 are defined by the gate wirings GLn−1 and GLn, and the source wirings DLm−1, DLm and DLm+1, but are not limited thereto. Particularly, the first TFT1 is formed in the first pixel part P1, which is electrically connected to (n)-th gate wiring GLn and (m)-th source wiring DLm.

The first TFT1 includes a first gate electrode GE, a gate insulation layer 510, a first channel part CH, a first drain electrode DE and a protecting insulation layer 520. The first gate electrode GE is electrically connected to the (n)-th gate wiring GLn. The gate insulation layer 510 is formed on the first gate electrode GE. The first channel part CH is formed on the gate insulation layer 510. The first drain electrode DE is electrically connected to the first pixel electrode PE1. The protecting insulation layer 520 is formed on the first source and first drain electrode SE and DE.

The second pixel part P2 includes a second TFT2 electrically connected to (n)-th gate line GLn and (m+1)-th data line DLm+1, respectively. The second TFT2 has the same structure of the first TFT1 shown in FIGS. 2 and 8, and therefore further explanation will be omitted.

The color filter layer 530 is formed on the second surface of the first base substrate 501. The color filter layer 530 may include a red filter pattern 530a, a green filter pattern 530b and a blue filter pattern 530c, for example, but is not limited thereto. Each color filter pattern 530a, 530b and 530c is formed in the corresponding pixel parts. A protection layer 535 may be formed on the color filter layer 530 so as to protect the color filter layer 530.

The pixel electrode layer PE is formed on the TFT layer TL. The pixel electrode layer PE includes an optically transparent and electrically conductive material. For example, the optically transparent and electrically conductive material may include ITO, IZO, or a-ITO, for example, but is not limited thereto. The pixel electrode layer PE includes a first pixel electrode PE1 electrically connected to the first TFT1 through a first contact portion CT1 and a second pixel electrode PE2 electrically connected to the second TFT2 through a second contact portion CT2.

The partition wall W is formed on the TFT layer TL which corresponds to an area in which the pixel electrode layer PE is not formed.

The light-blocking area which blocks light corresponds to the partition wall section W, and the transparent area which transmits light corresponds to the remaining area. For example, the partition wall section W is formed in an area having the first TFT1 and second TFT2 formed therein and an area having a plurality of gate lines GLn−1 and GLn and a plurality of source lines DLm−1, DLm and DLm+1 formed therein.

In exemplary embodiments, the partition wall section W defines a pixel space corresponding to first and second pixel parts having first and second pixel electrodes PE1 and PE2, respectively.

The electrophoretic layer 550 includes a plurality of microcapsules 540 and a binder (not shown) combining the microcapsules 540 to each other. The microcapsules 540 are infiltrated into each pixel space defined by the partition wall section W.

The first and second pixel parts P1 and P2 are divided by the partition wall section W, so that the microcapsules 540 are not disposed in a boundary portion between the first and second pixel parts P1 and P2. Therefore, a reduction of a reflecting ratio and a reduction of color reproducibility may be prevented, which are generated when the microcapsules 540 are disposed in the boundary portion.

The opposite substrate 400 includes a second substrate 401 and a common electrode layer CE. The second base substrate 401 may include a flexible material. For example, the second substrate 401 may include polyethylene terephthalate ("PET") which has excellent light transmittance, thermal resistance, chemical resistance, physical strength, for example, but is not limited thereto. The common electrode layer CE may include an optically transparent and electrically conductive material.

The opposite substrate 400 is attached to the color filter substrate 500 by a ruminator (not shown).

Figure 9A:
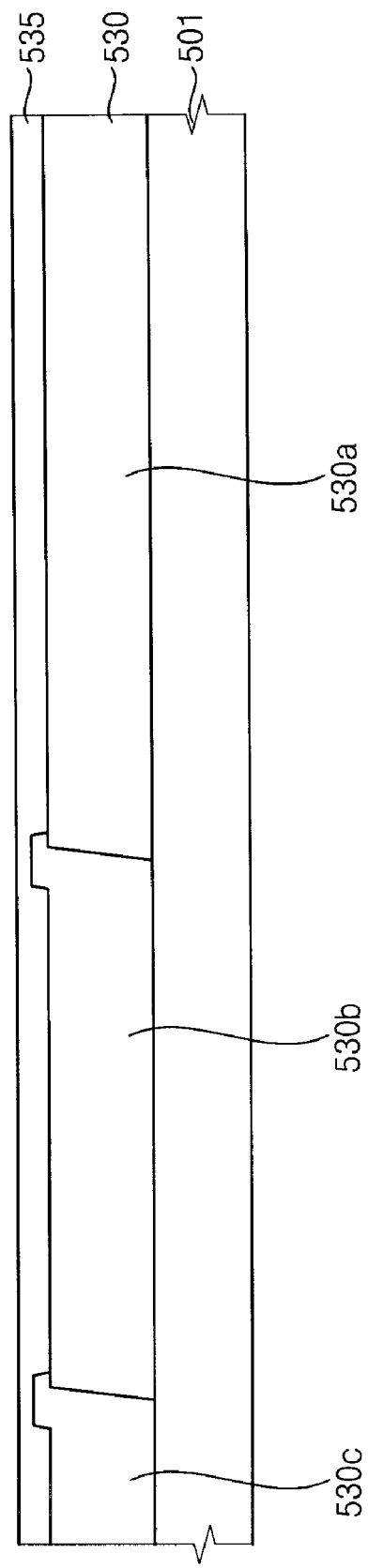
Figure 9C:
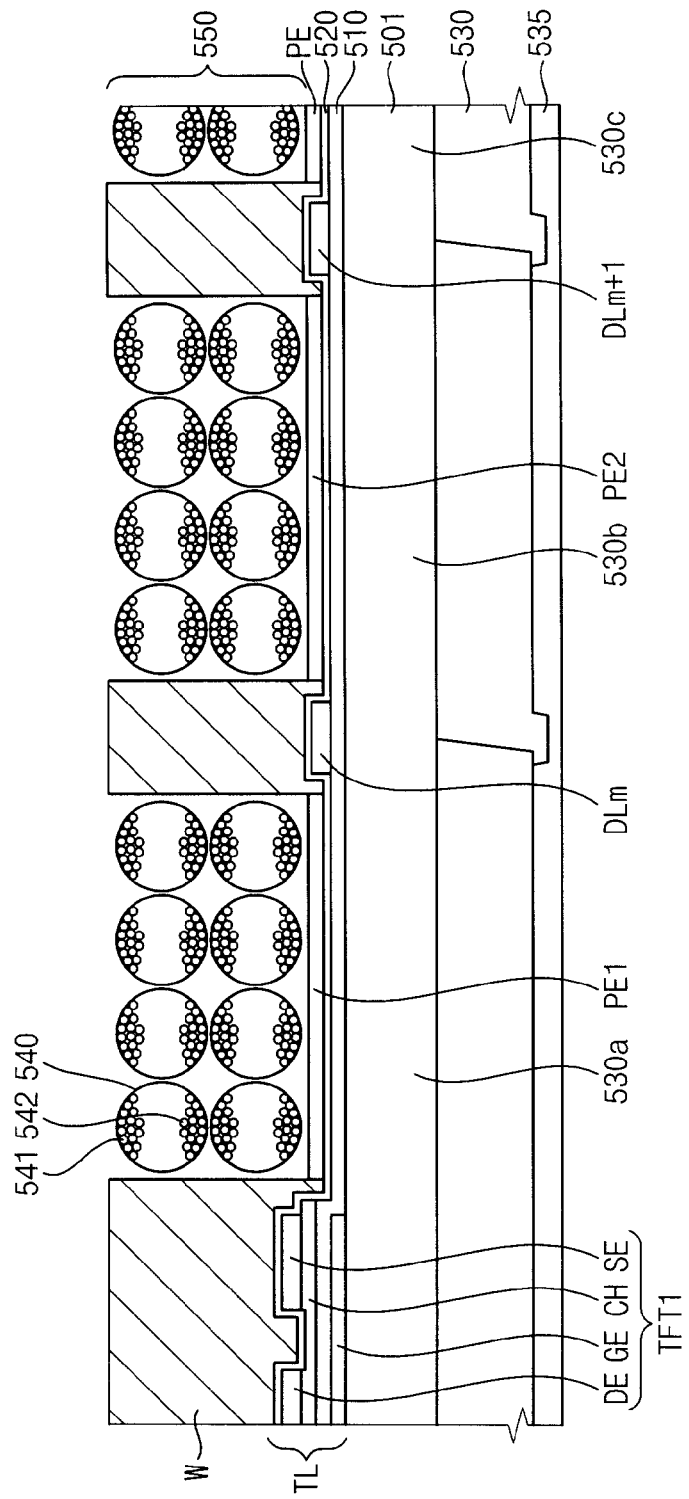

FIGS. 9A to 9C are cross-sectional views showing a method for manufacturing a color filter substrate of the EPD device in FIG. 8.

Referring to FIGS. 2 and 9A, a first base substrate 501 includes a first surface and a second surface facing the first surface. A color filter layer 530 is formed on the second surface of the first base substrate 501. The color filter layer 530 may include a red filter pattern 530a, a green filter pattern 530b and a blue filter pattern 530c, for example, but is not limited thereto. Each color filter pattern 530a, 530b and 530c is formed in the corresponding pixel parts. A protection layer 535 may be formed on the color filter layer 530 so as to protect the color filter layer 530.

Referring to FIGS. 2 and 9B, a TFT layer TL is formed on the first surface of the first base substrate 501. Particularly, a gate metal pattern including a plurality of gate wirings GLn−1 and GLn, and a first gate electrode GE is formed on the first base substrate 501. A gate insulation layer 510 is formed on the gate metal pattern of the first base substrate 501. A channel pattern including a first channel part CH is formed on the gate insulation layer 510.

A source metal pattern is formed on the first base substrate 501 having the channel pattern formed therein, which includes a plurality of source wirings DLm−1, DLm and DLm+1, a first source electrode SE and a first drain electrode DE. A protecting insulation layer 520 is formed on the source metal pattern of the first base substrate 501. A first TFT1 and a second TFT2 are formed on the first base substrate 501.

A pixel electrode layer PE is formed on the TFT layer TL. The pixel electrode layer PE includes a first pixel electrode PE1 and a second pixel electrode PE2. The first pixel electrode PE1 is electrically connected to the first TFT1 through the first contact portion CT1. The second pixel electrode PE2 is electrically connected to the second TFT2 through the second contact portion CT2.

Referring to FIGS. 2 and 9C, a partition wall W is formed on the first base substrate 501 having the pixel electrode layer PE formed therein. The partition wall W is formed on the TFT layer TL corresponding to an area in which the pixel electrode layer PE is not formed therein, so that the partition wall W defines a pixel space corresponding to the pixel electrode PE in exemplary embodiments, but is not limited thereto. For example, the partition wall W is formed in an area corresponding to the first TFT1 and second TFT2, and an area corresponding to the gate and source wirings GLn−1, GLn, DLm−1, DLm and DLm+1.

An electrophoretic layer 550 including a plurality of electrophoretic particles 540 is formed in a pixel space having the partition wall W formed therein. The microcapsules 540 include a plurality of electrophoretic particles 541 and 542 which are either negatively or positively charged.

As described above, a partition wall section is formed in the color filter substrate for an EPD device to define a pixel space corresponding to the pixel part in exemplary embodiments, and an electrophoretic layer 550 including a plurality of electrophoretic particles is infiltrated into the pixel space, so that it prevents microcapsules from being disposed in a boundary portion between the pixel parts. Therefore, reflecting ratio and color reproducibility may be enhanced.

Although the exemplary embodiments of the present invention have been described, it is understood that the present invention should not be limited to these exemplary embodiments but various changes and modifications can be made by one ordinary skill in the art within the spirit and scope of the present invention as hereinafter claimed.

What is claimed is:

1. A color filter substrate comprising:
a base substrate;
a partition wall section formed on a first surface of the base substrate, the partition wall section dividing the base substrate into a transparent area and a light-blocking area to define a pixel space in the transparent area;
a color filter layer formed in the transparent area;
an electrophoretic layer formed in the pixel space, the electrophoretic layer including a plurality of electrophoretic particles; and
an electrode layer including an optically transparent and electrically conductive material, the electrode layer being formed between the first surface and the electrophoretic layer, wherein the color filter layer is formed between the first surface and the electrode layer.

2. The color filter substrate of claim 1, wherein the color filter layer is formed between the electrode layer and the electrophoretic layer.

3. The color filter substrate of claim 2, further comprising:
a thin-film transistor layer formed between the first surface and the partition wall section.

4. The color filter substrate of claim 3, wherein the electrode layer comprises a plurality of pixel electrodes electrically connected to respective thin-film transistors.

5. The color filter substrate of claim 4, wherein the color filter layer is formed on the thin-film transistor layer corresponding with the pixel electrodes.

6. The color filter substrate of claim 5, wherein the partition wall section is formed on the color filter layer between the pixel electrodes.

7. The color filter substrate of claim 5, wherein the color filter layer is formed on a second surface of the base substrate that faces the first surface in correspondence with the pixel electrode.

8. The color filter substrate of claim 7, wherein the partition wall section is formed on the thin-film transistor layer between the pixel electrodes.

9. The electrophoretic display device of claim 8, wherein the partition wall section comprises:
a first partition wall having a first height; and
a second partition wall having a second height that is higher than the first height, wherein the second partition wall is formed between the adjacent first partition walls.

10. The electrophoretic display device of claim 9, wherein the first height corresponds to a thickness of the electrophoretic layer.

11. The electrophoretic display device of claim 9, wherein the second height corresponds to a thickness of the color filter layer.

12. An electrophoretic display device comprising:
a color filter substrate comprising a partition wall section, a color filter layer and an electrophoretic layer, the partition wall section being formed on a first surface of a first base substrate and dividing the first base substrate into a transparent area and a light-blocking area to define a pixel space in the transparent area, the color filter layer formed in the transparent area, and the electrophoretic layer being formed in the pixel space and including a plurality of electrophoretic particles; and
an opposite substrate facing the color filter substrate, where the color filter substrate further comprises a first electrode layer formed between the first surface and the electrophoretic layer, and the color filter layer is formed between the first surface and the electrode layer.

13. The electrophoretic display device of claim 12, wherein the opposite substrate comprises a second electrode layer facing the first electrode layer.

14. The electrophoretic display device of claim 13, wherein the color filter layer is formed between the first electrode layer and the electrophoretic layer.

15. The electrophoretic display device of claim 14, wherein the color filter substrate further comprises a thin-film transistor layer formed between the first surface and the partition wall section.

16. The electrophoretic display device of claim 15, wherein the first metal layer comprises a plurality of pixel electrodes electrically connected to a respective thin-film transistor of a plurality of thin-film transistors.

17. The electrophoretic display device of claim 16, wherein the color filter layer is formed on the thin-film transistor layer corresponding with the pixel electrodes.

18. The electrophoretic display device of claim 17, wherein the partition wall section is formed on the color filter layer between the pixel electrodes.

19. The electrophoretic display device of claim 18, wherein the color filter layer is formed on a second surface of the first base substrate facing the first surface corresponding with the pixel electrodes.

20. The electrophoretic display device of claim 19, wherein the partition wall section is formed on the thin-film transistor layer between the pixel electrodes.

21. A method of manufacturing a color filter substrate, the method comprising:
forming a partition wall section on a first surface of a base substrate, the partition wall section dividing the base substrate into a transparent area and a light-blocking area to define a pixel space in the transparent area;
forming an electrode layer including an optically transparent and electrically conductive material;
forming a color filter layer in the transparent area; and
forming an electrophoretic layer in the pixel space, the electrophoretic layer including a plurality of electrophoretic particles,
wherein the electrode layer is formed between the first surface and the electrode and the color filter layer is formed between the first surface and the electrode layer.

* * * * *